June 12, 1934.   H. M. WILCOX   1,963,057
METHOD OF FORMING TUBULAR STRUCTURAL ELEMENTS
Original Filed Oct. 3, 1930   3 Sheets-Sheet 1

INVENTOR.
Hallie M. Wilcox.
BY Slough and Canfield
ATTORNEY.

June 12, 1934. H. M. WILCOX 1,963,057
METHOD OF FORMING TUBULAR STRUCTURAL ELEMENTS
Original Filed Oct. 3, 1930 3 Sheets-Sheet 2
Fig 9
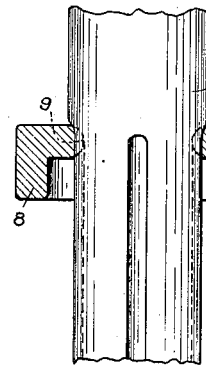
Fig 11
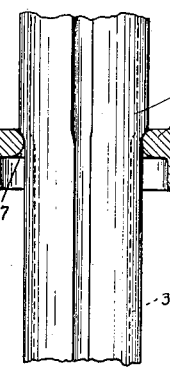
Fig 13
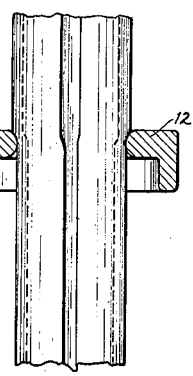
Fig 15
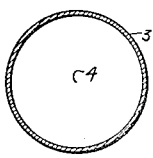
Fig 10
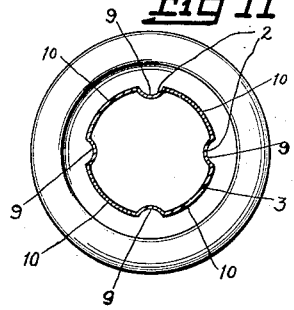
Fig 12
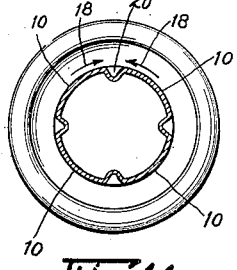
Fig 14
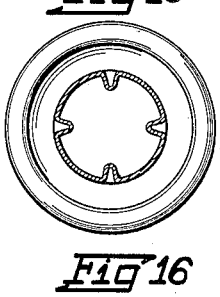
Fig 16
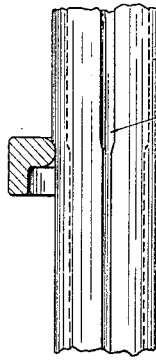
Fig 17
Fig 19
Fig 21
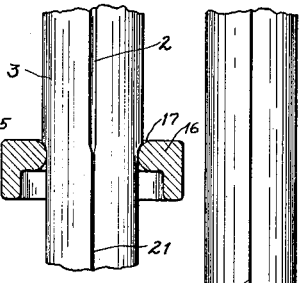
Fig 23
Fig 25
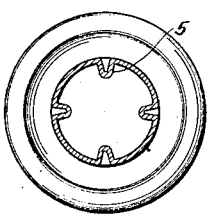
Fig 18
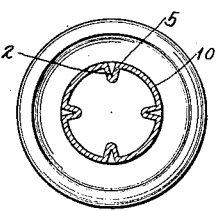
Fig 20
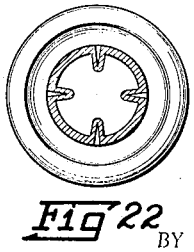
Fig 22
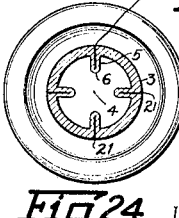
Fig 24
INVENTOR.
Hallie M. Wilcox.
BY Slough and Caufield
ATTORNEY.

June 12, 1934.  H. M. WILCOX  1,963,057

METHOD OF FORMING TUBULAR STRUCTURAL ELEMENTS

Original Filed Oct. 3, 1930  3 Sheets-Sheet 3

INVENTOR.
Hallie M. Wilcox.
BY
Slaugh and Canfield
ATTORNEY.

Patented June 12, 1934

1,963,057

UNITED STATES PATENT OFFICE 1,963,057

METHOD OF FORMING TUBULAR STRUCTURAL ELEMENTS

Hallie M. Wilcox, Geneva, Ohio, assignor to The American Fork & Hoe Company, Cleveland, Ohio, a corporation of Ohio Original application October 3, 1930, Serial No. 486,179. Divided and this application January 17, 1933, Serial No. 652,185

16 Claims. (Cl. 29—155)

My invention relates to tubular structural elements and relates more particularly to tubular structural elements of a kind suitable for use as posts, beams, masts, struts, or the like.

This application is divisional of my copending application Serial No. 486,179, filed October 3, 1930.

Tubular structural elements have heretofore been formed from cast, drawn, or rolled steel, or like metal, and have been reinforced in various ways such as by providing the same with externally or internally disposed ribs, in order to achieve greater resistance against flexure and fracture for a given weight.

However, such prior efforts have achieved but little success in the art, since the constructions evolved have been expensive to produce, and achieve the functional results, if at all, to but a limited degree, and in addition, the finished product has commonly contained faults incidental to the carrying out of the process whereby the element was produced, such as blow-holes in cast structures, and crystallization in drawn structures.

Briefly described, my invention comprises a sheet metal tube preferably of seamless construction, having longitudinally extending inwardly directed stiffening ribs formed by inwardly folding the wall of the tube at intervals proceeding along its circumference.

Broadly considered, my invention comprises such tubes whether made uniformly cylindrical in form, longitudinally tapered, or variant forms, and with improved internal stiffening ribs extending longitudinally of the tube, either in a direction parallel with the axis of the tube, or encircling such axis helically or spirally, as may be determined most advantageous for the particular purpose to which the tube formed according to the principles of my invention is to be put.

An object of my invention is to provide an improved method for forming improved tubular structural elements.

Another object of my invention is to provide an improved method of forming non-cylindrical tubular elements.

Another object of my invention is to provide a method of forming improved structural elements suitable for use where resistance to flexure breakage, and minimum weight per unit of length, are requisites.

Another object of my invention is to provide an improved method for forming improved structural elements of relatively great strength for unit of weight and which may be produced in a relatively inexpensive manner.

Another object of my invention is to provide an improved method of forming tubular structural elements suitable for use for such purposes as golf shafts, struts for use in aircraft construction, etc., where lightness and strength are highly desirable.

Another object of my invention is to provide an improved method of forming improved tubular structural elements of progressively varied sectional form.

Another object of my invention is to provide an improved method for forming improved tubular structural elements having the maximum of resistance to flexure and fracture and the minimum of weight per unit of length, and which may be of such form as to more strongly resist efforts directed thereagainst from a given lateral direction than stresses imparted to it from directions angular thereto.

Other objects of my invention, and the invention itself, will become more apparent by reference to the following description of certain embodiments of my invention, and methods and means for forming the said embodiments in which description reference is had to the accompanying drawings illustrating the said embodiments and the said methods and means for forming the same.

Figures 1, 2:
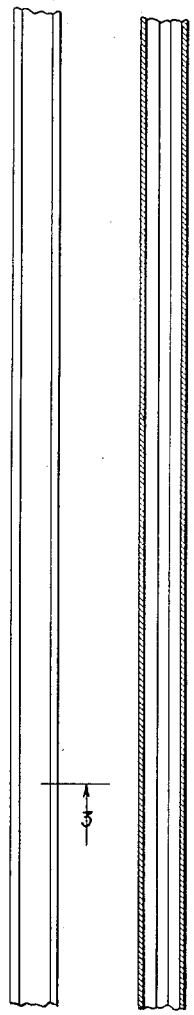
Fig. 1 is a side elevational view of a cylindrical tube embodying the principles of my invention.
Fig. 2 is a longitudinal medial sectional view of the tube of Fig. 1.
Figures 4, 5:
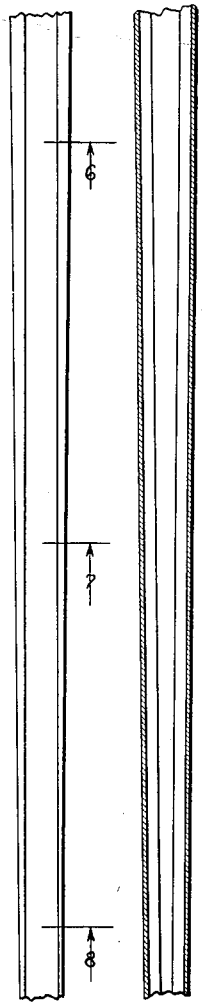
Fig. 4 is a side elevational view of a tapered tube which is a second embodiment of my invention.
Fig. 5 is a longitudinal medial sectional view of the tube of Fig. 4.
Figure 6:
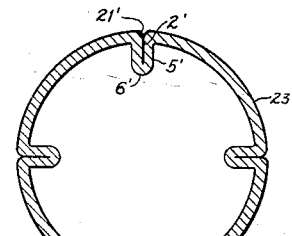
Figure 7:
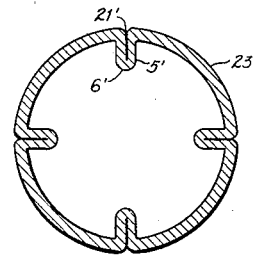
Figure 8:
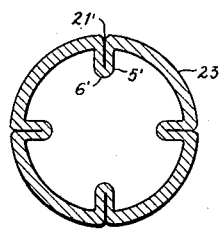
Figure 3:
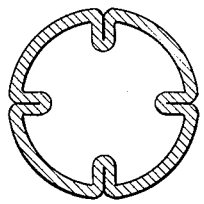
Fig. 3 is a transverse sectional view taken on the line 3—3 of Fig. 1 of the tube of the foregoing figures.
Figure 27:
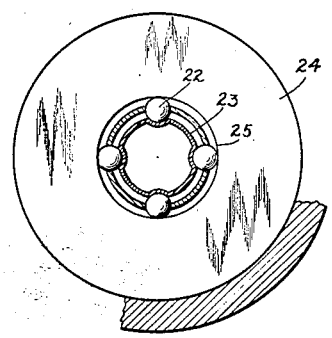
Figure 26:
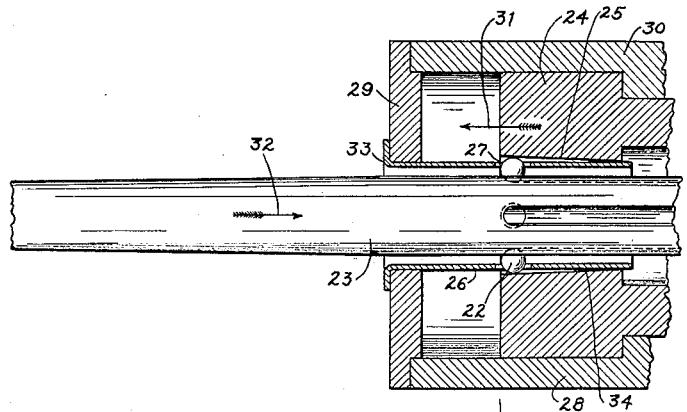
Figure 29:
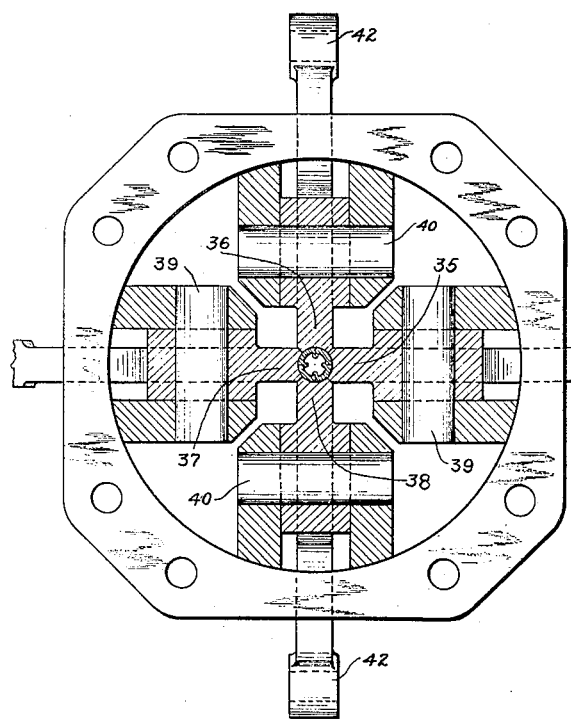
Figure 28:
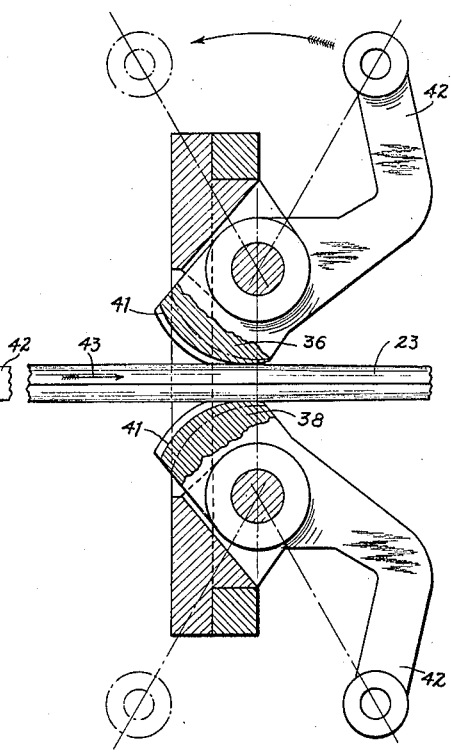

Figs. 6, 7 and 8 are enlarged transverse sections taken on the lines 6—6, 7—7 and 8—8, respectively of Fig. 4;

Figs. 9, 10, 11, 12, 13, 14, 15, 16, 17, 18, 19, 20, 21, 22, 23, 24 and 25 are illustrative of the successive steps of a process whereby the tubes of Figs. 1 to 3 inclusive embodying the principles of my invention may be formed;

Fig. 26 is a longitudinal medial sectional view of an adjustable ball die element employed in the production of the tubes of Figs. 4 to 8 inclusive;

Fig. 27 is a section taken on the line 27—27 of Fig. 26;

Figs. 28 and 29 are respectively views taken each at right angles to each other of adjustable drawing die means adapted for the production of the reinforced tapered tube of Figs. 4 to 8 inclusive.

Referring now first to the embodiment of my invention illustrated in Figs. 1 to 3 inclusive, and which may be formed in the manner indicated by Figs. 9 to 25 inclusive, the tube thereof is preferably formed from a cylindrical tube as illustrated in Figs. 9 and 10, by providing it with equally separated longitudinally extending grooves such as shown at 2, Figs. 11 and 12, by depressing longitudinally extending portions of the outer wall 3 of the tube inwardly toward the longitudinal axis thereof.

Although the longitudinally extending grooves 2 may be formed in the tube in any of a number of different ways, this is preferably accomplished in the manner illustrated in Fig. 11, wherein a die element 7 is shown comprising a body portion 8, and a die orifice 10 provided with inwardly directed projections 9.

After the grooves 2 are provided, the tube is subjected to successive compressive operations illustrated more or less diagrammatically in Figs. 13, 15, 17, 19, 21 and 23, resulting in successive deformations of the tube walls as illustrated by the transverse views of the successive forms taken by the tube walls of Figs. 14, 16, 18, 20, 22, and 24, and by the elevational view of the finished tube shown in Fig. 25.

The aforesaid views illustrate the progressive reduction effects upon the grooved tube 3 by the reducing dies 11, 12, 13, 14, 15, and 16 respectively, which have die apertures of progressively reduced diameters.

In other words, the die 11, Fig. 13, has a die aperture 17 but slightly less in diameter than the diameter of the tube 3, which is projected through such aperture, preferably by being pushed through the die and therefore since the die 11 is strong and unyielding, the diameter of the tube 3 will be reduced and to a diameter indicated at 3', Fig. 13, representing the portion of the tube which is already passed through the aperture of the die 11.

After the tube has passed through the die 11, it is successively passed through the other dies taken in order until the desired reduction of the diameter of the tube is effected.

At the same time, as indicated successively in Figs. 12, 14, 16, 18, 20, 22, and 24, the inwardly directed wall portions 2 are formed into folds progressively deepened, and narrowed until ultimately each of the folds, achieves the form shown in Fig. 24, wherein each fold is shown as comprising a pair of parallel contiguous thicknesses of metal as shown at 5, integrally joined together at 6 and the outer surface of the tube 3 becomes of approximately smooth circular contour, the space between the two thicknesses 5 of metal forming the folds being so reduced that these thicknesses of metal abut and to all intents and purposes may appear as if the folds are of but one piece of metal. The tube so formed is illustrated in Figs. 1 to 3 inclusive, and in Figs. 24 and 25, the two joined thicknesses of metal 5 having abutting walls proceeding longitudinally of the tube and each extending radially of its axis 4, towards which it projects for its entire length. The outer surface of the tube appears to be cylindrical, the tube being so formed and finished that little or no trace of the seams at the walls is readily observable.

During the successive steps of process the movement of the material adjacent the grooves 20 is substantially in the direction of the arrows 18 shown in Fig. 14, and then inwardly radially as the process still further progresses.

The tube produced as shown in Figs. 1 to 3 inclusive and in Figs. 24 and 25, is of a considerably reduced diameter relative to the diameter of the tube shown in Figs. 9 and 10, from which the internally ribbed tube of Fig. 24 is formed, and preferably is of increased wall thickness, this latter result being effected by the drawing operations sought to be illustrated by the intermediate figures of the drawings, 13, 15, 17, 19, 21 and 23.

The inwardly directed, longitudinally extending, closed folds 2 of the tube wall 3, being integral therewith, and equally spaced around the tube, form stiffening ribs of drawn sheet metal which give the maximum of strength to the tube without unduly increasing the weight thereof.

This is especially advantageous where the tube is subjected to stress which would otherwise tend to break or unduly bend the same, where weight of material is an important desideratum, where increased resistance to torsional stresses is desired, and/or in cases where the cost of the tube to withstand such stress must not be great.

The ribs conjointly prevent collapsing of the tube and the closure of the folds effects an increased resistance to torsional stress.

Referring now to the embodiment of my invention illustrated in Figs. 4 to 8 inclusive, I show therein a tube which is in many respects similar to the tube of Figs. 1 to 3 inclusive, the differences resulting from a progressive reduction of the diameter of the finished tube proceeding toward one end thereof. In this embodiment of my invention, a progressively tapered tube is provided having longitudinally extending internal ribs to strengthen the tube, these being disposed at intervals preferably equi-distant around the inner wall of the tube.

In forming the tube of Figs. 4 to 8 inclusive, this may preferably be done by starting with a tapered tube having lateral walls, of gradually reduced diameter proceeding toward an end of the tube, and in any suitable manner giving such a tapered tube a preliminary grooving operation, analogous to that effected in the tube of my first said embodiment by the die 7 of Fig. 11, as previously described.

The die 7, however, is unsuitable to providing longitudinal grooves of uniform depth in a tapered tube. Therefore, the apparatus illustrated in Figs. 26 and 27 may advantageously be employed for the grooving operation.

Referring to Figs. 26 and 27, the tapered tube is illustrated as being drawn in the direction of the arrow placed thereon through a die mechanism having a plurality of die balls 22, four in number adapted to engage the outer surface of the tube shown at 23 at equi-distant points around the outer surface. The four die balls 22 are held in place between the outer surface of the tube 23 and the inner annular surface 25 of a ball die adjusting element 24, by a die retaining tube 26 having four like apertures 27 spaced equi-distantly around the tube, as illustrated, each aperture being sufficiently large to receive one of the balls 22 and to permit it to freely rotate in the aperture, due to relative longitudinal movements of the tube 23 and the ball adjusting element 24.

The die element of Fig. 26 is provided with a support 28 having an end wall 29, the adjusting element 24 being fitted snugly within the lateral tubular walls 30 of the support and being guided thereby while being movable adjustably in the longitudinal direction, indicated by the arrow 31, therein.

The ball die element illustrated in Fig. 26 is described more fully together with means associated therewith for relatively longitudinally adjusting the parts 24 and 28 thereof, in a copending application of James L. Cassady, Serial No. 350,621, filed March 28, 1929, for Tube re-forming machines, wherein the same is fully described in connection with the drawing of tubes to a straight tapered form, such tubes being rotated at a very high rate of speed while being operated upon in the mechanism of the said application.

Although the tube 23 may be formed from an initially cylindrical tube, such as shown in Fig. 9, by processing it with a ball die mechanism as shown in Fig. 26 and as more completely illustrated in the said copending application of James L. Cassady, the present description of the use of the ball die mechanism of Fig. 26 relates only to the provision in a tube 23 of straight tapered form of a plurality of preferably equally spaced grooves in its outer surface by inwardly deflecting portions of the walls of the tube in the manner described for the tube operated upon in connection with Figs. 9 to 25, inclusive, and in such an operation illustrated in Fig. 26, the tube 23 is not rotated when being drawn through the die mechanism of Fig. 26 in the direction indicated by the arrow 32, and likewise the die bal's 22 are retained in a given rotative position relative to that of the tube 23 during the grooving operation, since the tube 26 by its flange 33 is rigidly and non-rotatably affixed by welding or the like to the end wall 29 of the stationary die element casing 28.

In a manner which will be more specifically understood by reference to the above said copending application of James L. Cassady, while the tube 23 is being drawn through the die with the die balls 22 pressed by their engagement with the inner tapered surface 25 of the ball adjusting element 24, to force the balls to such a distance inwardly axially of the tube 23 as will effect bodily movement of the wall portions of the tube in engagement with the balls to effect the proper depth of grooving, the element 24 is gradually adjusted in the casing 28 in the direction of the arrow 31, until ultimately the portion 34 of the tapered surface 25 of the ball adjusting element, and which is of least diameter, engages the balls 22, and forces them so far inwardly, as to effect the same depth of grooving in the outer surfaces of the tube 23, even though at that time the smaller end of the tube 23 is positioned in the die element of Fig. 26, and subjected to the pressure engagement of the die balls 22.

The rate of advance of the adjusting element 24 is mechanically correlated with the speed of movement of the tube 23, so that as the die balls engage the smaller end of the tube, they are moved inwardly by the advance of the adjusting element 24 an amount equal to the changed diameter of the tube portion operated upon.

By the preferred means illustrated and described, there has been provided a straight tapered tube 23 with a plurality, four in number, of external grooves, on its outer surface, effected by bodily inward movement of longitudinally extending portions of the walls of the tube toward the axis of the tube, preferably an equal distance for all longitudinally disposed portions, in a manner analogous to that illustrated in Fig. 12.

The grooved tube operated upon by the apparatus of Figs. 26 and 27 is now projected through adjustable die elements of a reducing die, which will still further reduce its diameter, and which will effect closure of the loops, depressions or grooves, effected upon the tapered tube 23 in a manner analogous to that previously described for the apparatus illustrated in connection with Figs. 9 to 23 inclusive. A preferred form of reducing die mechanism adaptable for the purpose is illustrated in Figs. 28 and 29, and is described more particularly in a copending application of Birney C. Batcheller, Serial No. 268,130, filed April 7th, 1928, for Method and machines for making golf club shafts, wherein referring to the Figs. 28 and 29 illustrating, in part, such apparatus, a plurality of radially disposed die elements shown at 35, 36, 37 and 38 are each journalled in oppositely disposed pairs on pins 39—39 and 40—40, for simultaneous rotation in such a direction that the opposing pairs of die elements, such as 37—35 and 36—38 may have their eccentrically extending, longitudinally grooved die surfaces 41 progressively projected inwardly toward the common focal point of the inwardly extending die elements, and which lies equi-distantly from the pairs of journal pins.

Each of the die elements is provided with an operating lever arm 42, and these by adjusting means, not shown herein, but specifically described in the said copending application of Birney C. Batcheller, are adapted for actuation, coincidentally, and to like amounts, progressively, as an intermediately disposed tube operated upon, in this case the tapered grooved tube 23, which is moved longitudinally through the die while compressively engaged by the two opposing pairs of eccentric grooved die surfaces 41.

The compressive reduction of the tapered tube 23, preliminarily grooved as described, is preferably effected by drawing the tube 23 in the direction of the arrow 43, at such a rate of lineal speed as when correlated to the rate of rotation of the die elements 35, 36, 37, and 38, simultaneously and coincidentally rotated, that as portions of the tube which are of progressively less diameters reach the compressing jaws of the cooperative die elements, the tube contacting portions of the jaws will be progressively moved closer and closer together to effect just the right amount of compressive reduction in diameter of the tapered tube corresponding to the degree of taper desired in the finished tube.

In the embodiment illustrated and described, it is contemplated that the circular line of maximum pressure, that is of least diameter, of the die jaws in contact with the tube at all times during longitudinal movement of the tube through the jaws, shall effect upon the portion of the tube contacting at any moment, the same percentage of reduction upon the tube as when contacting any other portion of the tube, in such a manner that the longitudinally extending grooves performed in the tube, corresponding to the grooves 2, Figs. 11 and 12 will proceed in approximately the forms shown in Figs. 14, 16, 18, 20, and 22 to the ultimate form desired, shown in Fig. 24.

In other words, the die elements will progressively contract the diameter of the die aperture, which in the embodiment illustrated is always of circular form to a point wherein the resultant tapered tube will be provided with internal dual fold ribs, as illustrated in Figs. 6, 7, and 8, comprising folded thicknesses 5' of the metal from the walls of the original tube 23 folded inwardly and joined at their innermost ends by an integral portion of the walls of the tube 23, 6', in such a manner that at the outer surface of the tube, the seam 21 will be scarcely visible, the seam provided by the closure of the groove 2' being substantially closed.

In the embodiment illustrated, the ribs comprising the portions 5'—6', are of the same depth throughout the length of the tapered tube and as previously described this is effected by providing grooves throughout the length of the tube of such depth in the portions of the tube so that when the tube is reduced to the same degree throughout its length, that is to the same fractional part of its former diameter in different portions of the tube, the same amount of metal will be crowded into the said rib portions to form the inwardly extending radially dual fold ribs.

However, within the purview of my invention, the grooving operation effected by means of such apparatus, as is shown in Figs. 26 and 27 may be otherwise effected relative to the ultimate ratio of tapering effected in the finished tube, whereby the ribs may be progressively increased in depth, that is the distance to which they project at the axis of the tube, as either the smaller end of the tube is approached or conversely as the larger end of the tube is approached. To effect such a result in either case, it is merely necessary to progressively adjust the die balls 22, Figs. 26 and 27, to provide the preliminary grooves, such as 2, to be of greater depth in that portion of the tube wherein the ribs are to be of greatest dimension, in combination with a tube reducing means adapted to sufficiently reduce the particular part of the tube operated upon to close the grooves regardless of their depth and width.

It will be observed that in order to accomplish this, the initial size of the tube operated upon must be sufficiently great, that the amount of reduction effected by the apparatus of Figs. 28 and 29 will be sufficient to ensure closure of the grooves.

Although in the foregoing I have referred to the tubular structural elements as being made from steel, I do not limit myself specifically to steel but wherever steel is referred to in the appended claims it is understood that this term is inclusive of any equivalent resilient metal such as phosphor bronze, aluminum bronze or the like.

Within the purview of my invention, I also contemplate filling the tubes to be operated upon with a soft filling such as lead, or the like, prior to the compressive operations, in order to support the walls of the tube from within against improper collapsing and yet to permit the infolding of the portions resulting in the internal ribs by forcible displacement of the lead material, which under pressure will be caused to flow from the inwardly displaced portions, and to be caused to project longitudinally from one or both of the ends of the tube operated upon.

The filling with the lead or other fluent material may be done either before the preliminary grooving operation or immediately thereafter, depending upon the extent of the grooving and the material and size of the tube. After the tube has been completely operated upon and the ribs formed, the fluent material will be removed in any suitable manner, such as by heating and melting, in the case of lead, or by otherwise removing it, in any well known manner.

Having thus described my invention both as applied to the provision of internal ribs, of dual fold form, of substantially closed or solid construction, in a sheet metal tube, in both cylindrical or tapered tubes, I am aware that numerous and extensive departures may be made from the embodiment herein illustrated and described, but without departing from the spirit of my invention.

I claim:

1. The method of forming a structural element consisting in longitudinally infolding the material of the walls of a tube at intervals around the tube and then performing a longitudinal die drawing operation on the intermediate portions proceeding from one end of the tube toward the other end to substantially close the folds.

2. The method of forming a tubular structural element comprising first indenting the outer surface of the tube longitudinally at spaced intervals in the circumferential direction, then performing a longitudinal die drawing operation on all portions of the outer surface of the intermediate portions proceeding from one end of the tube toward the other to compressively reduce the effective diameter of the tube and consequently close the infolded portions of the wall material to provide interior stiffening ribs of a double thickness of the materials of the wall of the tube.

3. The method of forming a structural element comprising bodily inwardly displacing longitudinally extending relatively circumferentially spaced portions of the lateral walls of a tube, and performing a die drawing operation on the intermediate nondisplaced portions of the tube to effect a reduction in diameter thereof proceeding from one end of the tube toward the other end, until the displaced portions progressively proceeding through the intermediate form of a loop take the ultimate form of internal ribs for the tube having a double thickness of wall material, both thicknesses brought together to close the loops.

4. The method of forming a structural element comprising bodily inwardly displacing longitudinally extending relatively circumferentially spaced portions of the lateral walls of a tube, and progressively compressing the intermediate nondisplaced portions of the tube to effect a reduction in diameter thereof proceeding from one end of the tube toward the other end, meanwhile varying the degree of the reduction to effect a tapered form, until the displaced portions progressively proceeding through the intermediate form of a loop take the ultimate form of internal ribs for the tube having a double thickness of wall material, both thicknesses brought together to close the loops.

5. The method of forming a structural element consisting in first placing within the tube a reinforcing fluent material, then infolding the material of the walls of the tube at intervals around the tube and then inwardly compressing the intermediate portions by a longitudinal die drawing operation proceeding from one end of the tube toward the other end thereof to substantially close the folds, and then removing the fluent material from the tube.

6. The method of forming a structural element consisting in infolding the material of the walls of a tube at intervals around the tube by a longitudinal die drawing operation, then placing within the tube so formed, a fluent reinforcing material, and then inwardly compressing the intermediate portions of the tube walls to substantially close the folds and then removing the fluent material from within the tube.

7. The method of forming a structural element consisting in infolding the material of the wall of a tube at intervals around the tube and then, inwardly compressing the intermediate portions to substantially close the fold meanwhile maintaining the original cross-sectional shape of the tube.

8. The method of forming a structural element comprising first indenting the outer surface of the tube longitudinally at spaced intervals in the circumferential direction, then applying inwardly directed pressure by a longitudinal die drawing operation to all portions of the outer surface of the intermediate portions to compressively reduce the effective diameter of the tube and consequently close the infolded portions of the wall material to provide interior stiffening ribs of a double thickness of the material of the wall of the tube.

9. The method of forming a structural element comprising bodily inwardly displacing longitudinally extending relatively circumferentially spaced portions of the lateral walls of a tube, and compressing the intermediate non-displaced portions of the tube to effect a reduction in diameter thereof until the displaced portions progressively proceeding through the intermediate form of a loop take the ultimate form of internal ribs for the tube having a double thickness of wall material, both thicknesses brought together to close the loop, meanwhile maintaining the tube in its original cross-sectional form.

10. The method of forming a structural element comprising bodily inwardly displacing longitudinally extending relatively circumferentially spaced portions of the lateral walls of a tube, and compressing the intermediate non-displaced portions of the tube to effect a reduction in diameter thereof proceeding from one end of the tube toward the other end, meanwhile varying the degree of the reduction to effect a tapered form, until the displaced portions progressively proceeding through the intermediate form of a loop take the ultimate form of internal ribs for the tube having a double thickness of wall material, both thicknesses brought together to close the loops.

11. The method of forming a structural element comprising bodily inwardly displacement of longitudinally extending relatively circumferentially spaced portions of the lateral walls of a tapered tube and compressing the intermediate non-displaced portions of the tube to effect a reduction in diameter thereof proceeding from one end of the tube toward the other, meanwhile varying the degree of the reduction to maintain the tapered form until the displaced portions progressively proceeding through the intermediate form of a loop take the ultimate form of internal ribs for the tube having a double thickness of wall material, both thicknesses brought together to close the loop.

12. The method of forming a structural element consisting in infolding the material of the walls of a tapered tube at intervals around the tube and then inwardly compressing the intermediate portions by a die drawing operation proceeding from one end of the tube toward the other to substantially close the folds.

13. The method of forming a structural element consisting in longitudinally infolding the material of the walls of a tube at intervals around the tube by a longitudinal die drawing operation and then inwardly compressing the intermediate portions of the tube to substantially close up the folds.

14. The method of forming a tubular structural element comprising first indenting the outer surface of the tube longitudinally at spaced intervals in the circumferential direction, by a longitudinal die drawing operation, then applying inwardly directed pressure to all portions of the outer surface of the intermediate portion proceeding from one end of the tube toward the other to compressively reduce the effective diameter of the tube and consequently close the infolded portions of the wall material to provide interior stiffening ribs of a double thickness of the material of the wall of the tube.

15. The method of forming a structural element comprising bodily inwardly displacing longitudinally extending relatively circumferentially spaced portions of the lateral walls of a tube by a longitudinal die drawing operation, and progressively compressing the intermediate non-displaced portions of the tube to effect a reduction in diameter thereof proceeding from one end of the tube toward the other end, meanwhile varying the degree of the reduction to effect a tapered form, until the displaced portions progressively proceeding through the intermediate form of a loop take the ultimate form of internal ribs for the tube having a double thickness of wall material, both thicknesses brought together to close the loops.

16. The method of forming a structural element consisting in infolding the material of the walls of a tapered tube by a longitudinal die drawing operation at intervals around the tube and then inwardly compressing the intermediate portions proceeding from one end of the tube toward the other to substantially close the folds.

HALLIE M. WILCOX.